US007535415B2

(12) United States Patent
Yoshioka et al.

(10) Patent No.: US 7,535,415 B2
(45) Date of Patent: May 19, 2009

(54) IMAGE RECORDING APPARATUS CAPABLE OF RECORDING POSITION AND DIRECTION INFORMATION OF OBJECT OF SHOOTING

(75) Inventors: Haruyuki Yoshioka, Suwon (KR); Masaki Oguro, Suwon (KR); Hiroshi Iizuka, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1470 days.

(21) Appl. No.: 10/410,228

(22) Filed: Apr. 10, 2003

(65) Prior Publication Data

US 2003/0194203 A1 Oct. 16, 2003

(30) Foreign Application Priority Data

Apr. 16, 2002 (KR) ............................ 2002-0020535

(51) Int. Cl.
*G01S 5/02* (2006.01)
(52) U.S. Cl. ............................ 342/357.08; 342/357.09; 342/357.13
(58) Field of Classification Search ............ 342/357.01, 342/357.08, 357.09, 357.13; 701/207, 213, 701/215; 386/46, 117
See application file for complete search history.

(56) References Cited

U.S. PATENT DOCUMENTS

2002/0045988 A1* 4/2002 Yokota ....................... 701/213

2002/0154070 A1* 10/2002 Sato et al. ....................... 345/8
2005/0001024 A1* 1/2005 Kusaka et al. ............... 235/375

FOREIGN PATENT DOCUMENTS

JP 09-135416 5/1997

OTHER PUBLICATIONS

Official Action issued by the Korean Intellectual Property Office on Oct. 23, 2007 in the corresponding Korea Patent Application No. 10-2002-0020535 (3 pages).

* cited by examiner

*Primary Examiner*—Dao L Phan
(74) *Attorney, Agent, or Firm*—Staas & Halsey LLP

(57) ABSTRACT

An image recording apparatus which records position information of a place of shooting an image of an object and direction information of the object relative to the recording apparatus. A shooting unit takes images of an object. A receiver receives data for position measurement being transmitted from a satellite and a position information calculator calculates position information using the satellite data. A sensing unit senses a direction of a terrestrial magnetic field and a direction information calculator calculates direction information based on the sensed direction. A transmitting unit transmits the position and direction information to the recording unit which records the position and direction information on a recording medium together with image data corresponding to the taken images. The position and direction information may then be displayed together with the images when the images are reproduced.

12 Claims, 4 Drawing Sheets

IMAGE RECORDING APPARATUS CAPABLE OF RECORDING POSITION AND DIRECTION INFORMATION OF OBJECT OF SHOOTING

CROSS REFERENCE TO RELATED APPLICATIONS

This application claims the benefit of Korean Application No. 2002-20535 filed Apr. 16, 2002, in the Korean Intellectual Property Office, the disclosure of which is incorporated herein by reference.

BACKGROUND OF THE INVENTION

1. Field of the Invention

The present invention generally relates to a digital camcorder which shoots and records images of an object, and more particularly, to a digital camcorder which also records position and direction information of the object of the shooting.

2. Description of the Related Art

Generally, a digital camcorder has a function of a video camera that shoots an image of an object and of a video recorder that records the image of the object. An operator of such a digital camcorder takes images of the object and records the taken images on a recording medium such as a magnetic tape or a memory stick. Further, the operator may check the images of the object by reproducing the images from the recording medium. Such reproduced images are displayed through a liquid crystal display, or a view finder. The reproduced images may also be checked by connecting the digital camcorder to an external display device such as a television display.

An advantage of the digital camcorder is that the digital camcorder is a portable image shooting device that is easy to use and is adapted to shoot an image of a desired object in any place, such as for example, a concert, etc. However, the digital camcorder has a disadvantage in that the digital camcorder cannot check the position of the object for which images are recorded during the display of the reproduced images from the recording medium.

In order to overcome the above-mentioned disadvantage, conventionally, a global positioning system (GPS) terminal has been used. The position information of the object of the shooting may be checked by matching the time of the image of the object with the time of the position information calculated from the portable GPS.

However, the operator experiences an inconvenience of having to carry the portable GPS terminal in every shooting in order to check the position of the object. Additionally, because the portable GPS terminal requires a memory of enough storage capacity to store the position information calculated through the portable GPS terminal, the unit price of the portable GPS terminal is quite expensive. The operator also experiences an inconvenience because the operator needs to check the time on the screen by connecting to a personal computer in order to match the time of the position information stored in the portable GPS terminal and the time of the image information stored in the recording medium of the digital camcorder. Further, although the conventional method can check the position of the object by matching the respective times, the conventional method cannot check the direction information, i.e., the direction of the object of the shooting. Accordingly, the operator of the camcorder has no choice but to estimate the direction of the shooting using landmarks that are located near the shooting location.

In order to solve the above-mentioned problem of the conventional cases, a GPS terminal having an electronic compass built therein has been suggested. The electronic compass can check the current position and direction. Through the GPS terminal having a built-in electronic compass therein, the current position and direction of the object of the shooting can be measured and stored. However, this suggestion has the following shortcoming. In order to check the position and direction of the shooting, the operator needs to connect the GPS terminal having the built-in electronic compass to a display device, reproduce images of the object of the shooting from the recording medium, and match the time of the measured position and direction information with the time of the images displayed on the display device.

The operator also needs to store the position and direction information of the shooting in a separate recording medium, and to keep the separate recording medium together with the recording medium storing the images of the object.

SUMMARY OF THE INVENTION

Accordingly, it is an aspect of the present invention to provide a digital camcorder which enables an operator of the digital camcorder to check position information and direction information of the shooting conveniently, to avoid a need for the operator to carry a GPS terminal having a built-in electronic compass with him/her in every shooting in order to check the position and direction information of the shooting.

It is another aspect of the present invention to provide a digital camcorder which enables an operator to easily check the position information and the direction information of the shooting, to avoid a need for the operator to connect a GPS terminal with a built-in electronic compass to obtain position and direction information and a reproducing apparatus to a display device in order to check the position and direction of the shooting.

Additional aspects and advantages of the invention will be set forth in part in the description which follows, and, in part, will be obvious from the description, or may be learned by practice of the invention.

The above and/or other aspects of the invention are accomplished by a position/direction measuring apparatus according to the present invention, comprising, a receiver which receives data for position measurement transmitted from a satellite, a position information calculator which calculates a position information using the data for position measurement being received at the receiver, a sensing unit which senses a direction of a terrestrial magnetic field, a direction information calculator which calculates direction information based on the information on the terrestrial magnetic field direction sensed by the sensing unit, a connecting unit connectable with an external device, and having a transmitting terminal which transmits the position information and the direction information to the external device, and a transmitting unit which transmits the position information and the direction information calculated by the position information calculator and the direction information calculator to the external device through the transmitting terminal.

The position information and the direction information are successively transmitted to the external device at predetermined time intervals. Further provided is a storage unit which stores the position information and the direction information calculated by the position information calculator and the direction information calculator at predetermined time intervals. Also, further provided are a power supply which supplies power to the receiver, the position information calculator, the sensing unit, the direction information calculator and the transmitting unit.

The above and/or other aspects are accomplished by an image recording apparatus according to the present invention, comprising, a shooting unit which takes images of an object, a recording unit which records the images of the object taken by the shooting unit on a recording medium, a receiver which receives data for position measurement being transmitted from a satellite, a position information calculator which calculates position information using the data for position measurement, a sensing unit which senses a direction of a terrestrial magnetic field, a direction information calculator which calculates a direction information based on the information on the direction of the terrestrial magnetic field sensed by the sensing unit, and a transmitting unit which transmits the position information and the direction information to the recording unit. When the position information and the direction information are received from the transmitting unit, the recording unit records the images of the object on the recording medium together with the position information and the direction information.

The image recording apparatus according to the present invention may further comprise a connecting unit having a fixing unit and a transmitting terminal. The fixing unit is constructed such that a first casing which houses the receiver, the position information calculator, the sensing unit, the direction information calculator and the transmitting unit therein, is removably secured to a second casing that houses the shooting unit and the recording unit. The transmitting terminal transmits the position information and the direction information to the recording unit. The transmitting terminal is formed on a part of either the first casing or the second casing.

The position information and the direction information may be successively transmitted to the recording unit at predetermined time intervals. According to the present invention, the image recording apparatus may further comprise a storage unit which successively stores the position information and the direction information calculated by the position information calculator and the direction information calculator at predetermined time intervals. A power supply for supplying a power to the receiver, the position information calculator, the sensing unit, the direction information calculator and the transmitting unit may also be provided. The image recording apparatus according to this embodiment may be a digital camcorder.

Since the information about the position and direction of the shooting is displayable on a screen together with the images being reproduced, it becomes easier for the operator to check the position and the direction of the shooting.

BRIEF DESCRIPTION OF THE DRAWINGS

The above and/or other aspects, features and other advantages of the present invention will be more clearly understood from the following detailed description taken in conjunction with the accompanying drawings, in which.

DETAILED DESCRIPTION OF THE PREFERRED EMBODIMENTS

Figure 1:
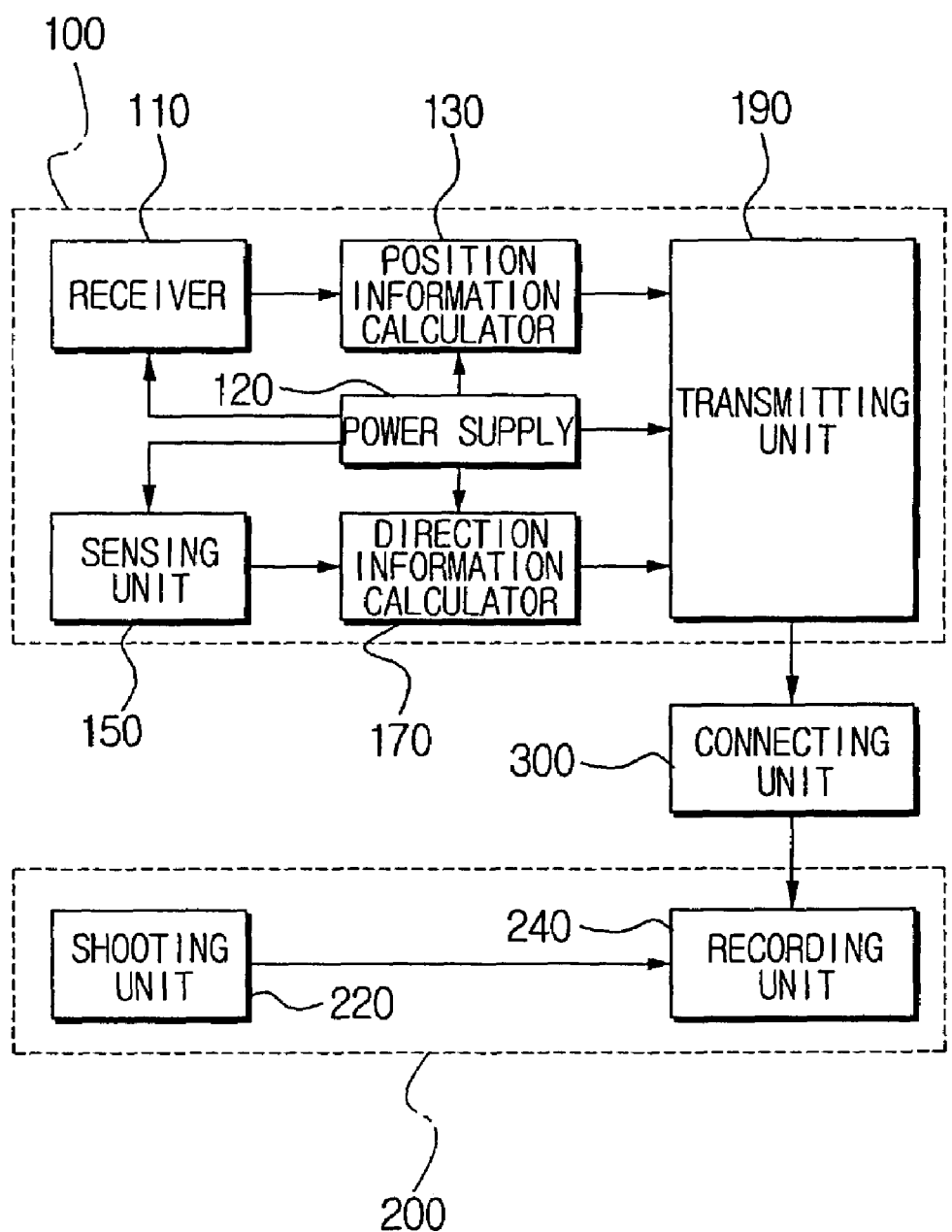
FIG. 1 is a block diagram showing an image recording apparatus for recording position and direction information of an object of a shooting according to an embodiment of the present invention.

Reference will now be made in detail to embodiments of the present invention, examples of which are illustrated in the accompanying drawings, wherein like reference numerals refer to like elements throughout.

FIG. 1 is a block diagram showing an image recording apparatus according to an embodiment of the present invention, which records position and direction information of an object of the shooting. Hereinafter, a camcorder will be described as the image recording apparatus by way of an example.

Referring to FIG. 1, the image recording apparatus comprises a position/direction measuring unit 100 which calculates position information and direction information, a recording system 200 which shoots an object and then records images of the object on a recording medium in association with the position information and the direction information calculated by the position/direction measuring unit 100, and a connecting unit 300 which separably connects the position/direction measuring unit 100 with the recording system 200 and transmits the position information and the direction information calculated by the position/direction measuring unit 100 to the recording system 200.

Accordingly, the recording system 200 records the images of the object on the recording medium together with the position information and the direction information received through the connecting unit 300. As a result, the position information and the direction information of the shooting may be checked during reproduction of the images from the recording medium.

A GPS terminal will be described as the position/direction measuring unit 100 by way of an example. The position/direction measuring unit 100 comprises a receiver 110, a position information calculator 130, a sensing unit 150, a direction information calculator 170, a transmitting unit 190 and a power supply 120. The receiver 110 receives data for position measurement from satellites. The position information calculator 130 calculates the position information on the current position using the data for position measurement received by the receiver 110. The sensing unit 150 detects the direction of a terrestrial magnetic field using an electronic compass. The direction information calculator 170 calculates the direction information based on the detected direction of the terrestrial magnetic field sensed by the sensing unit 150.

The transmitting unit 190 transmits the position information and the direction information calculated from the position information calculator 130 and the direction information calculator 170, respectively, to the recording system 200 through the connecting unit 300. The power supply 120 supplies independent power to the position/direction measuring unit 100 irrespective of whether the position/direction measuring unit 100 is connected with the recording system 200 through the connecting unit 300. Accordingly, the power supply 120 supplies independent power to the receiver 110, the position information calculator 130, the sensing unit 150, the direction information calculator 170 and the transmitting unit 190.

The recording system 200 comprises a shooting unit 220 and a recording unit 240. The shooting unit 220 takes the images of the object, and converts the taken images into a form that is recordable on the recording medium. The recording unit 240 combines the images output from the shooting unit 220 with the position information and the direction information received through the connecting unit 300, and records the combined data on the recording medium.

Figure 2:
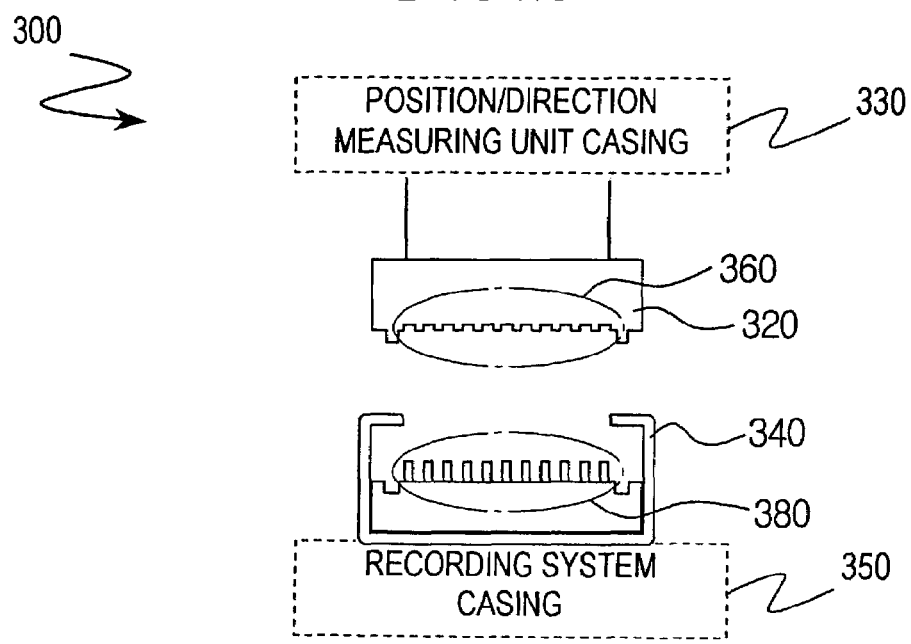
FIG. 2 is a sectional view showing an example of the connecting unit shown in FIG. 1.

FIG. 2 is a sectional view showing an example of the connecting unit 300 shown in FIG. 1. As shown, the connecting unit 300 comprises a first fixing unit 320, a second fixing unit 340, a first transmitting terminal 360 and a second transmitting terminal 380. The first fixing unit 320 and the first transmitting terminal 360 are provided on a part of a casing 330 of the position/direction measuring unit 100. The second fixing unit 340 and the second transmitting terminal 380 are provided on a part of a casing 350 of the recording system 200. The second fixing unit 340 and the second transmitting terminal 380 may be formed according to a common specification so that other accessories required for shooting may be mounted thereon.

The first and the second fixing units 320 and 340 are constructed such that they are removably secured to each other. The first and the second transmitting terminals 360 and 380 are connected by engagement of the first fixing unit 320 with the second fixing unit 340, to enable the position/direction measuring unit 100 to transmit the position information and the direction information output from the position/direction measuring unit 100 to the recording system 200. Accordingly, with the image recording apparatus according to the present invention, the position information and the direction information of the object of the shooting are displayed together with the images of the object during a reproducing of the images from the recording medium. As a result, the operator does not experience an inconvenience of having to connect the position/direction measuring unit 100 to an external device, such as a computer, in order to check the position and direction of the images of the object.

Figure 3:
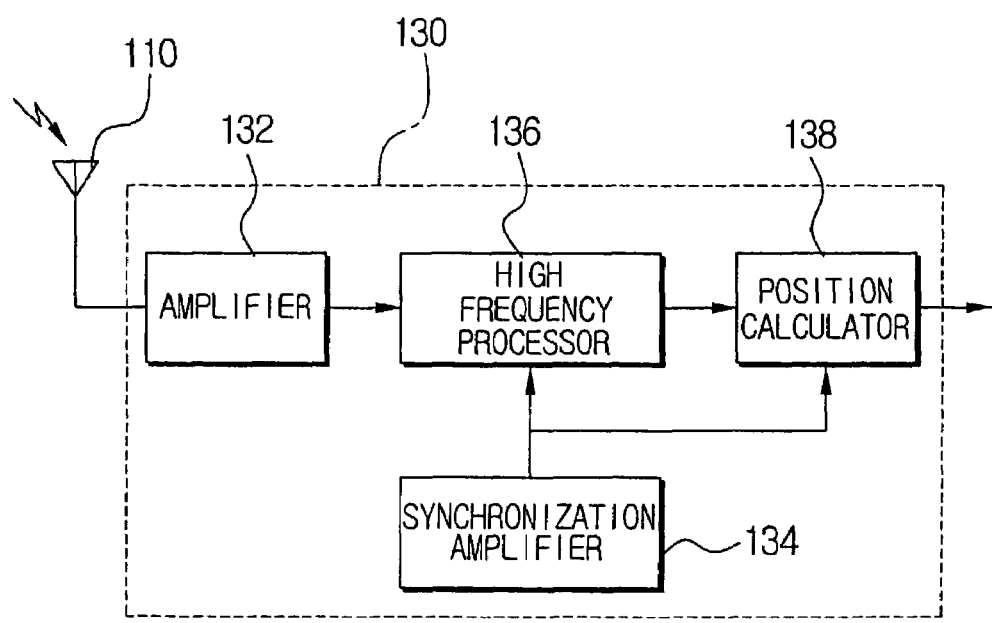
FIG. 3 is a block diagram showing an example of the position information calculator shown in FIG. 1.

FIG. 3 is a block diagram showing the position information calculator shown in FIG. 1 in greater detail. The position information calculator 130 comprises an amplifier 132, a synchronization amplifier 134, a high frequency signal processor 136 and a position calculator 138. The amplifier 132 analog-amplifies the data for position measurement from an antenna 110 that receives the data for position measurement from the satellites. The synchronization amplifier 134 provides the synchronization signal for the data for position measurement that is amplified by the amplifier 132. The high frequency signal processor 136 high frequency signal processes the amplified data for position measurement based on the provided synchronization signal. The position calculator 138 calculates a current position based on the synchronization signal provided by the synchronization amplifier 134 and the data for position measurement that is output from the high frequency signal processor 136.

Figure 4:
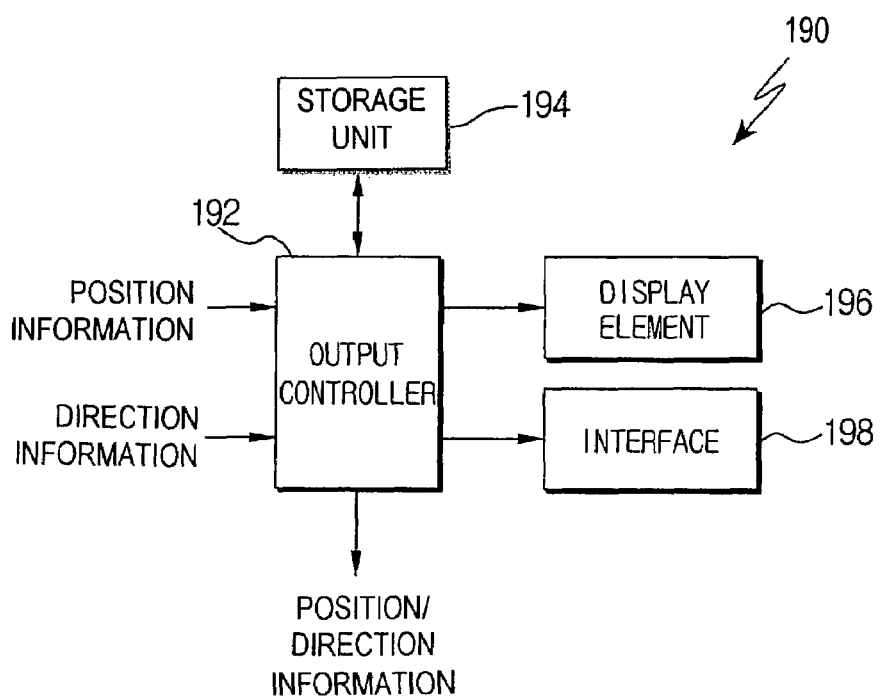
FIG. 4 s a block diagram showing an example of the transmitting unit shown in FIG. 1.

FIG. 4 is a block diagram showing the transmitting unit 190 shown in FIG. 1 in greater detail. The transmitting unit 190 comprises an output controller 192, a storage unit 194, a display element 196 and an interface 198. The output controller 192 outputs the position information and the direction information calculated by the position calculator 138 and the direction information calculator 170, respectively, via a data transmission bus in accordance with a predetermined processing. The storage unit 194 stores the position information and the direction information output from the output controller 192. The display element 196 displays the position information and the direction information output from the output controller 192 on a display such as a LCD (not shown). The interface 198 outputs the position information and the direction information output from the output controller 192 to an external device such as a computer.

When the position/direction measuring unit 100 is connected with the recording system 200 through the connecting unit 300, the output controller 192 transmits the position information and the direction information calculated by the position calculator 138 and the direction information calculator 170, respectively, to the recording system 200. Further, when the position/direction measuring unit 100 is not in connection with the recording system 200 through the connecting unit 300, the position information and the direction information calculated at the position calculator 138 and the direction information calculator 170 are stored in the storage unit 194. The storage 194 may successively store the position information and the direction information at predetermined time intervals.

Figure 5:
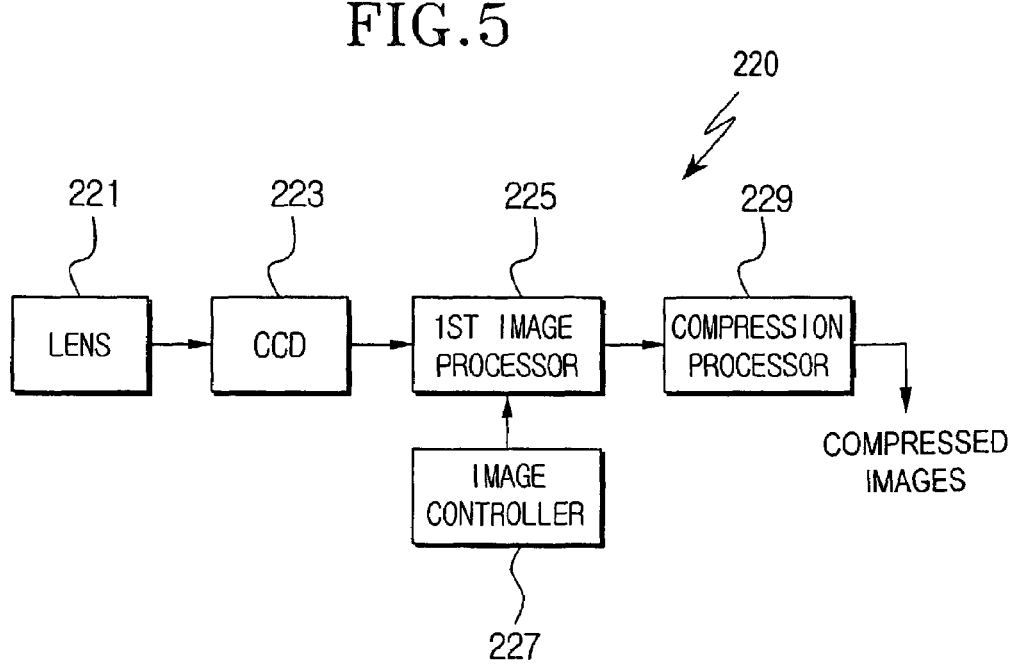
FIG. 5 is a block diagram showing an example of the shooting unit shown in FIG. 1.

FIG. 5 is a block diagram showing the shooting unit 220 shown in FIG. 1 in greater detail. The shooting unit 220 comprises a lens 221, a charge coupled device (CCD) 223, a first image processor 225, an image controller 227 and a compression processor 229. The lens 221 is for shooting the object. The CCD 223 accumulates the images of the object and transmits the accumulated images. The first image processor 225 converts the images provided by the CCD 223 into a signal of a recordable format. The image controller 227 controls the signal conversion of the first image processor 225. The compression processor 229 compresses the images converted at the first image processor 225 in accordance with a predetermined image recording format of the recording system 200 and outputs the compressed images.

Figure 6:
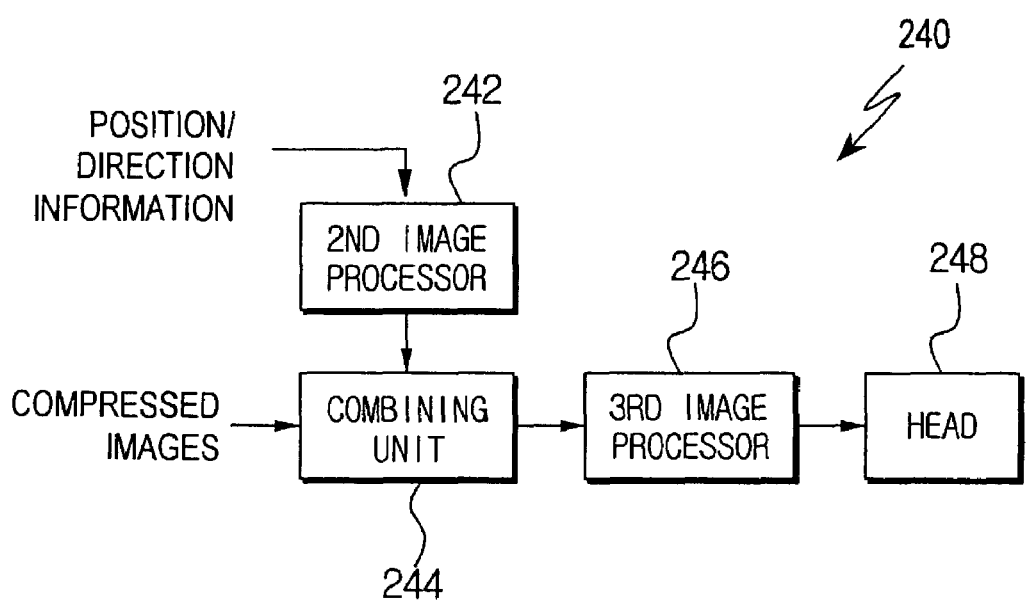
FIG. 6 is a block diagram showing an example of the recording unit shown in FIG. 1.

FIG. 6 is a block diagram showing the recording unit 240 shown in FIG. 1 in greater detail. The recording unit 240 comprises a second image processor 242, a combining unit 244, a third image processor 246 and a head 248. The second image processor 242 converts the position information and the direction information transmitted through the connecting unit 300 into a format recordable on the recording medium. The combining unit 244 combines the compressed images from the compression processor 229 with the position information and the direction information from the second image processor 242 into a single signal. The third image processor 246 converts the combined signal of the images, the position information and the direction information from the combining unit 244 into a format recordable on the recording medium. The head 248 records the signal converted by the third image processor 246 on the recording medium. A magnetic tape may used for the recording medium by way of an example. Further, the signal converted at the third image processor 246 into a recordable format may be stored in a recording medium such as a Smart Card.

In the embodiment shown, the position/direction measuring unit 100 may comprise a separate casing structure that is removably connected with the recording system 200 through the connecting unit 300. However, such construction is by way of an example and is not to be considered as limiting. In another example, a device which calculates the position information and the direction information of the current shooting as the position/direction measuring unit 100, may be built in a predetermined area of the recording system 200.

According to the present invention, during a shooting of images of an object, the position information and the direction information calculated at the position/direction measuring unit 100 are recorded on the recording medium together with the taken images. Since the taken images and the position information and the direction information are recorded together on the recording medium, it is convenient for the operator to keep the position and direction information on the recording medium.

Further, since the information about the position and direction of the shooting is displayed on the screen together with the images being reproduced, it becomes easier for the operator to check the position and the direction of the shooting.

Although an embodiment of the present invention has been shown and described, it would be appreciated by those skilled in the art that changes may be made in this embodiments without departing from the principles and spirit of the invention, the scope of which is defined in the claims and their equivalents.

What is claimed is:

1. An image recording apparatus, comprising:
   a shooting unit which takes images of an object;
   a recording unit which records the images of the object taken by the shooting unit on a recording medium;
   a receiver which receives data for position measurement transmitted from a satellite;
   a position information calculator which calculates position information of the shooting unit using the data for position measurement;
   a sensing unit which senses a direction of a terrestrial magnetic field;
   a direction information calculator which calculates direction information of the object relative to the shooting unit based on the sensed direction of the terrestrial magnetic field; and
   a transmitting unit which transmits the position information and the direction information to the recording unit,
   wherein the recording unit records the position information and the direction information on the recording medium together with the images of the object.

2. The image recording apparatus of claim 1, further comprising:
   a first casing which houses the receiver, the position information calculator, the sensing unit, the direction information calculator and the transmitting unit therein;
   a second casing which houses the shooting unit and the recording unit;
   a fixing unit which removably secures the first and second casings; and
   a transmitting terminal which transmits the position information and the direction information from the transmitting unit to the recording unit.

3. The image recording apparatus of claim 2, wherein:
   the transmitting terminal is formed on one of the first casing and the second casing.

4. The image recording apparatus of claim 3, wherein:
   the transmitting unit successively transmits the position information and the direction information to the recording unit at predetermined time intervals.

5. The image recording apparatus of claim 4, further comprising:
   a storage unit which successively stores the position information and the direction information at predetermined time intervals.

6. The image recording apparatus of claim 5, further comprising:
   a power supply which supplies power to the receiver, the position information calculator, the sensing unit, the direction information calculator and the transmitting unit.

7. A digital camcorder, comprising:
   a shooting unit which takes images of an object;
   a recording unit which records the images of the object taken by the shooting unit on a recording medium;
   a receiver which receives data for position measurement transmitted from a satellite;
   a position information calculator which calculates position information of the shooting unit using the data for position measurement;
   a sensing unit which senses a direction of a terrestrial magnetic field;
   a direction information calculator which calculates direction information of the object relative to the shooting unit based on the sensed direction of the terrestrial magnetic field; and
   a transmitting unit which transmits the position information and the direction information to the recording unit,
   wherein the recording unit records the position information and the direction information on the recording medium together with the images of the object.

8. The digital camcorder of claim 7 further comprising:
   a first casing which houses the receiver, the position information calculator, the sensing unit, the direction information calculator and the transmitting unit therein;
   a second casing which houses the shooting unit and the recording unit;
   a fixing unit which removably secures the first and second casings; and
   a transmitting terminal which transmits the position information and the direction information from the transmitting unit to the recording unit.

9. The digital camcorder of claim 8, wherein:
   the transmitting terminal is formed on one of the first casing and the second casing.

10. The digital camcorder of claim 9, wherein:
    the transmitting unit successively transmits the position information and the direction information to the recording unit at predetermined time intervals.

11. The digital camcorder of claim 10, further comprising:
    a storage unit which successively stores the position information and the direction information at predetermined time intervals.

12. The digital camcorder of claim 11, further comprising:
    a power supply which supplies power to the receiver, the position information calculator, the sensing unit, the direction information calculator and the transmitting unit.

* * * * *

UNITED STATES PATENT AND TRADEMARK OFFICE
CERTIFICATE OF CORRECTION

PATENT NO. : 7,535,415 B2  Page 1 of 1
APPLICATION NO. : 10/410228
DATED : May 19, 2009
INVENTOR(S) : Haruyuki Yoshioka et al.

It is certified that error appears in the above-identified patent and that said Letters Patent is hereby corrected as shown below:

Column 7, Line 35, change "obiect." to --object.--.

Column 8, Line 30, change "claim 7" to --claim 7,--.

Signed and Sealed this

Ninth Day of March, 2010

David J. Kappos
*Director of the United States Patent and Trademark Office*